US012609101B2

(12) United States Patent
Sharma

(10) Patent No.: US 12,609,101 B2
(45) Date of Patent: Apr. 21, 2026

(54) METHOD OF DETECTING A SPEECH IMPEDIMENT AND PROVIDING VISUAL FEEDBACK AS AN AVATAR TO A USER

(71) Applicant: Microsoft Technology Licensing, LLC, Redmond, WA (US)

(72) Inventor: Mrinal Kumar Sharma, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 18/471,635

(22) Filed: Sep. 21, 2023

(65) Prior Publication Data

US 2025/0104689 A1　　Mar. 27, 2025

(51) Int. Cl.
*G10L 13/02*　　(2013.01)
*G10L 15/22*　　(2006.01)

(52) U.S. Cl.
CPC .............. *G10L 13/02* (2013.01); *G10L 15/22* (2013.01)

(58) Field of Classification Search
CPC ......... G10L 13/02; G10L 15/22; G10L 25/51; G10L 21/10
See application file for complete search history.

(56) References Cited

U.S. PATENT DOCUMENTS

| | | | | |
|---|---|---|---|---|
| 7,031,922 B1* | 4/2006 | Kalinowski | ............... | A61F 5/58 |
| | | | | 600/23 |
| 2003/0182111 A1* | 9/2003 | Handal | .................... | G09B 5/04 |
| | | | | 704/254 |

| | | | | |
|---|---|---|---|---|
| 2006/0064037 A1* | 3/2006 | Shalon | ................... | G16H 20/60 |
| | | | | 128/903 |
| 2013/0104477 A1* | 5/2013 | Collison | ............... | E04F 15/203 |
| | | | | 52/309.1 |
| 2013/0226576 A1* | 8/2013 | Jaiswal | ................. | G10L 13/033 |
| | | | | 704/E15.005 |
| 2014/0267313 A1* | 9/2014 | Marsella | ............... | G06T 13/205 |
| | | | | 345/474 |
| 2017/0286752 A1* | 10/2017 | Gusarov | .............. | G06V 40/171 |
| 2017/0374402 A1* | 12/2017 | Pogorelik | .......... | H04N 21/4756 |
| 2018/0286430 A1* | 10/2018 | Shapira | ................ | A61B 5/7282 |
| 2018/0314689 A1* | 11/2018 | Wang | .................. | G10L 15/1822 |
| 2019/0311732 A1 | 10/2019 | Vadassery et al. | | |
| 2021/0050029 A1 | 2/2021 | Kleinberger et al. | | |
| 2022/0122587 A1 | 4/2022 | Thomson et al. | | |
| 2022/0215830 A1 | 7/2022 | Jawahar et al. | | |
| 2023/0343053 A1* | 10/2023 | Scapel | .................... | G06F 3/012 |
| 2024/0257811 A1* | 8/2024 | Gray | ....................... | G06F 3/167 |

* cited by examiner

*Primary Examiner* — Michael N Opsasnick

(74) *Attorney, Agent, or Firm* — NovoTechIP International PLLC

(57)　　ABSTRACT

A system and method and for providing speech assistance during a virtual meeting includes receiving a request over a communication network to provide speech assistance during a virtual meeting between a plurality of participants and analyzing speech data of the virtual meeting, via a speech impediment detection engine, to detect a speech impediment for one of the plurality of participants. Upon detecting the speech impediment, an avatar is automatically generated for the participant experiencing speech impediment and the avatar is synchronized with the participant's speech in real-time during the communication session to provide real-time visual feedback to the participant. The avatar is then provided for display to the participant.

19 Claims, 12 Drawing Sheets

300D

340 — COLLECT A TRAINING DATASET

342 — EXTRACT AUDIO AND VISUAL FEATURES FROM THE DATA

344 — ALIGN SPEECH IMPEDIMENT INSTANCES WITH VISUAL AND AUDIO DATA

346 — TRAIN THE MODEL USING A TRAINING MECHANISM

348 — USE A VALIDATION DATASET TO ASSESS THE MODEL'S PERFORMANCE

350 — FINE-TUNE THE MODEL BASED ON THE VALIDATION DATA

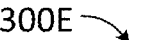
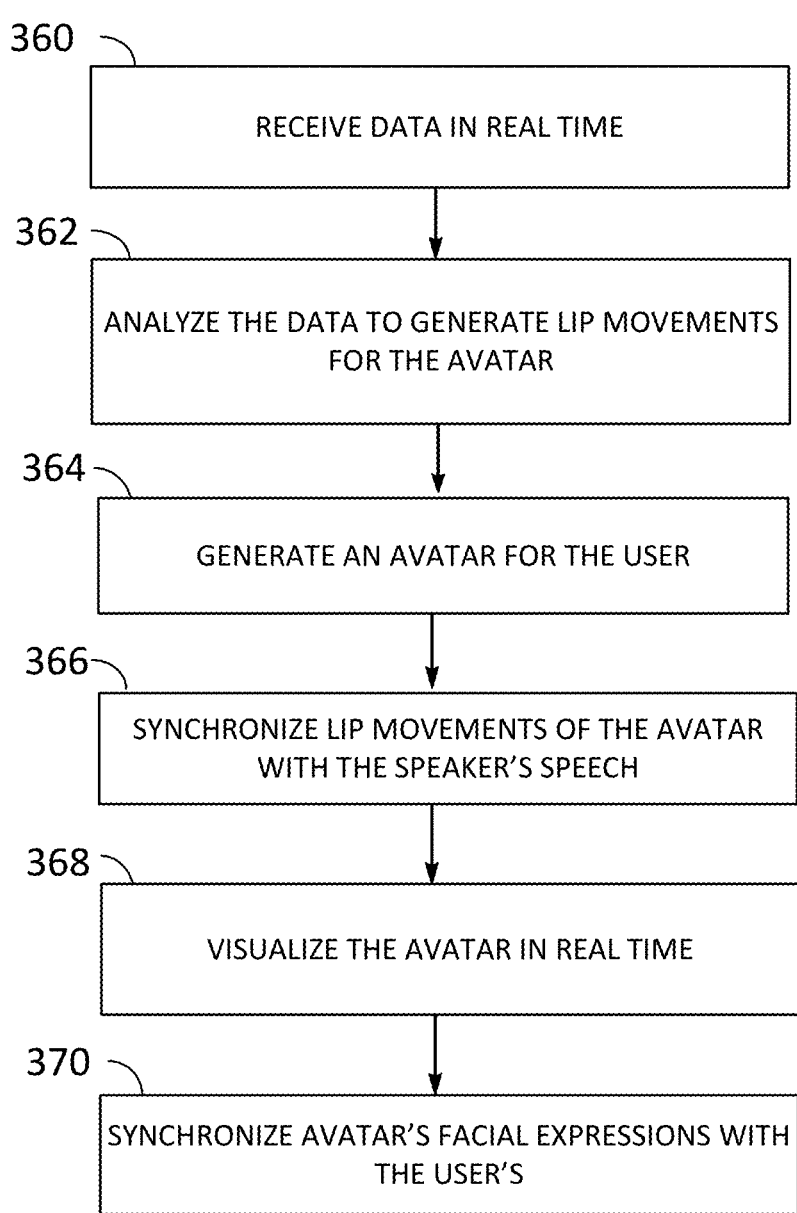
360 — RECEIVE DATA IN REAL TIME
362 — ANALYZE THE DATA TO GENERATE LIP MOVEMENTS FOR THE AVATAR
364 — GENERATE AN AVATAR FOR THE USER
366 — SYNCHRONIZE LIP MOVEMENTS OF THE AVATAR WITH THE SPEAKER'S SPEECH
368 — VISUALIZE THE AVATAR IN REAL TIME
370 — SYNCHRONIZE AVATAR'S FACIAL EXPRESSIONS WITH THE USER'S
FIG. 3E

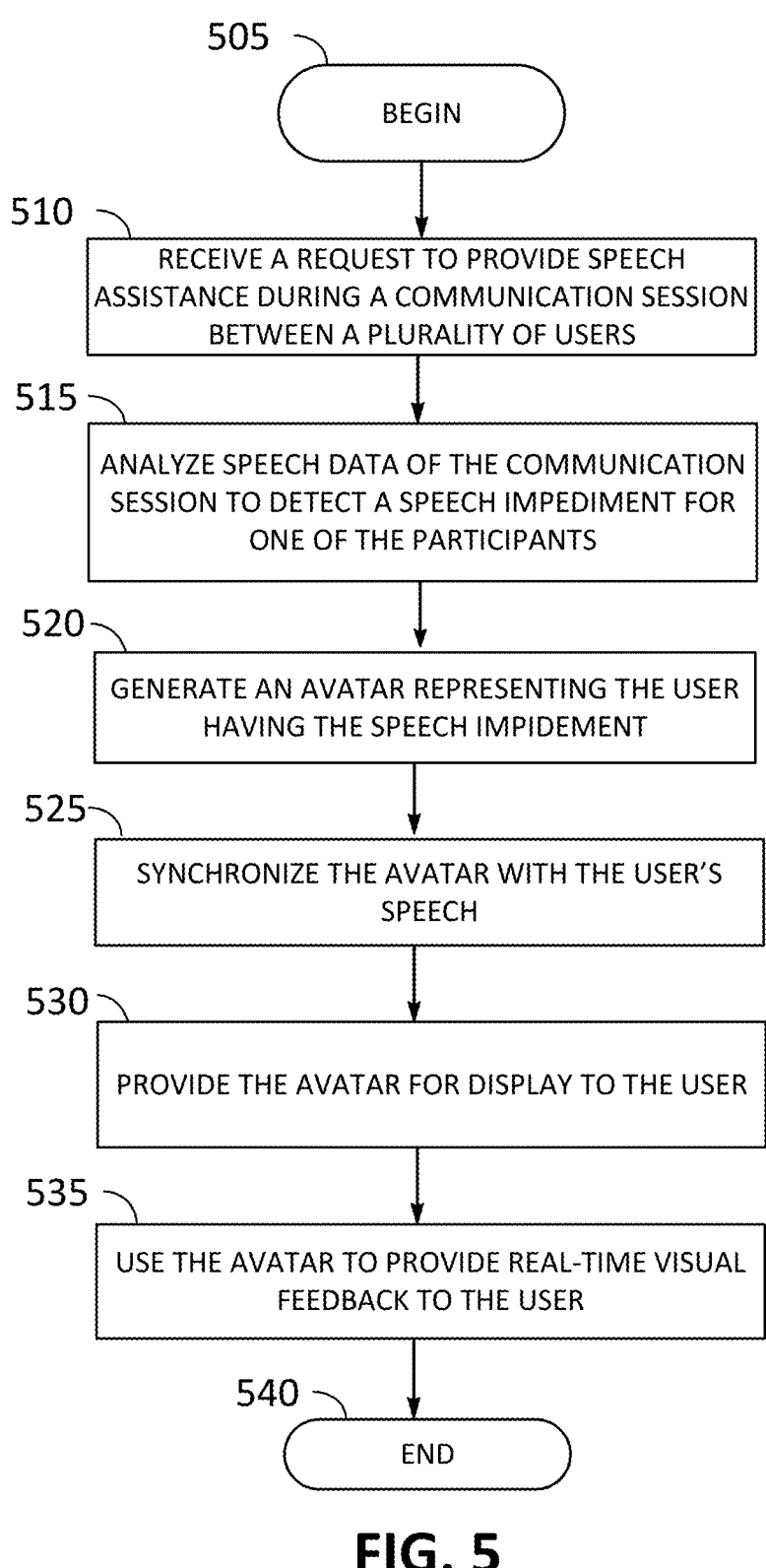

500

505 BEGIN

510 RECEIVE A REQUEST TO PROVIDE SPEECH ASSISTANCE DURING A COMMUNICATION SESSION BETWEEN A PLURALITY OF USERS

515 ANALYZE SPEECH DATA OF THE COMMUNICATION SESSION TO DETECT A SPEECH IMPEDIMENT FOR ONE OF THE PARTICIPANTS

520 GENERATE AN AVATAR REPRESENTING THE USER HAVING THE SPEECH IMPIDEMENT

525 SYNCHRONIZE THE AVATAR WITH THE USER'S SPEECH

530 PROVIDE THE AVATAR FOR DISPLAY TO THE USER

535 USE THE AVATAR TO PROVIDE REAL-TIME VISUAL FEEDBACK TO THE USER

540 END

FIG. 5

METHOD OF DETECTING A SPEECH IMPEDIMENT AND PROVIDING VISUAL FEEDBACK AS AN AVATAR TO A USER

BACKGROUND

In recent years, there has been a significant increase in the use of virtual meetings. Many users utilize virtual meetings as part of their work, social interactions and/or educational learning to participate in meetings, attend a class or educational session and/or interact with others. While there are many benefits to conducting meetings virtually, for users with speech disorders such as stuttering, such meetings can be very challenging. That is because the visual and auditory aspects of video conferencing can exacerbate feelings of self-consciousness and anxiety and as such increase instances of speech impediment. Furthermore, the audio and visual aspects of virtual meetings often make it more difficult for people with speech disorders to communicate effectively. While some mechanisms have been developed in recent years to improve the speech of general population users during presentations and/or meetings, those mechanisms do not address communication disorders of users who suffer from speech disorders. Hence, there is a need for improved systems and methods of providing accessibility to virtual meetings for users who suffer from speech disorders.

SUMMARY

In one general aspect, the instant disclosure presents a data processing system having a processor and a memory in communication with the processor wherein the memory stores executable instructions that, when executed by the processor, cause the data processing system to perform multiple functions. The functions include accessing speech data from a communication session between a plurality of participants, the communication session being conducted via a communications application over a network; extracting a plurality of audio features from the speech data; providing the plurality of audio features as an input to a speech impediment detection machine-learning (ML) model to detect a speech impediment for one of the plurality of participants; upon detecting the speech impediment, utilizing a lip synchronization engine to generate an avatar that provides a visual representation of the one of the participants; providing the avatar for display on a user interface screen of the communications applications of the one of the plurality of participants, upon detecting the speech impediment; and synchronizing the avatar with the one of the participants' speech in real-time during the communication session to provide real-time visual feedback to the one of the plurality of participants.

In yet another general aspect, the instant disclosure presents a method for providing speech assistance during a virtual meeting. In some implementations, the method includes receiving a request over a communication network to provide speech assistance during a virtual meeting between a plurality of participants; extracting a plurality of audio features from speech data of the virtual meeting; providing the plurality of audio features as an input to a speech impediment detection ML model to detect a speech impediment for one of the plurality of participants; upon detecting the speech impediment, automatically generating an avatar for the one of the plurality of participants; synchronizing the avatar with the one of the participants' speech in real-time during the virtual meeting to provide real-time visual feedback to the one of the plurality of participants; and providing the avatar for display to the one of the plurality of participants.

In a further general aspect, the instant application describes a non-transitory computer readable medium on which are stored instructions that when executed cause a programmable device to perform functions of accessing speech data from a communication session between a plurality of participants, the communication session being conducted via a communications application over a network; extracting a plurality of audio features from speech data of the virtual meeting; providing the plurality of audio features as an input to a speech impediment detection ML model to detect a speech impediment for one of the plurality of participants; upon detecting the speech impediment, utilizing a lip synchronization engine to generate an avatar that provides a visual representation of the one of the participants; providing the avatar for display on a user interface screen of the communications applications of the one of the plurality of participants, upon detecting the speech impediment; and synchronizing the avatar with the one of the participants' speech in real-time during the communication session to provide real-time visual feedback to the one of the plurality of participants.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3E is a flow diagram depicting an exemplary method for using a lip synchronization model to synchronize an avatar with a user's speech.

FIG. 5 is a flow diagram depicting an example method for providing speech assistance during a communication session.

DETAILED DESCRIPTION

Figure 1:
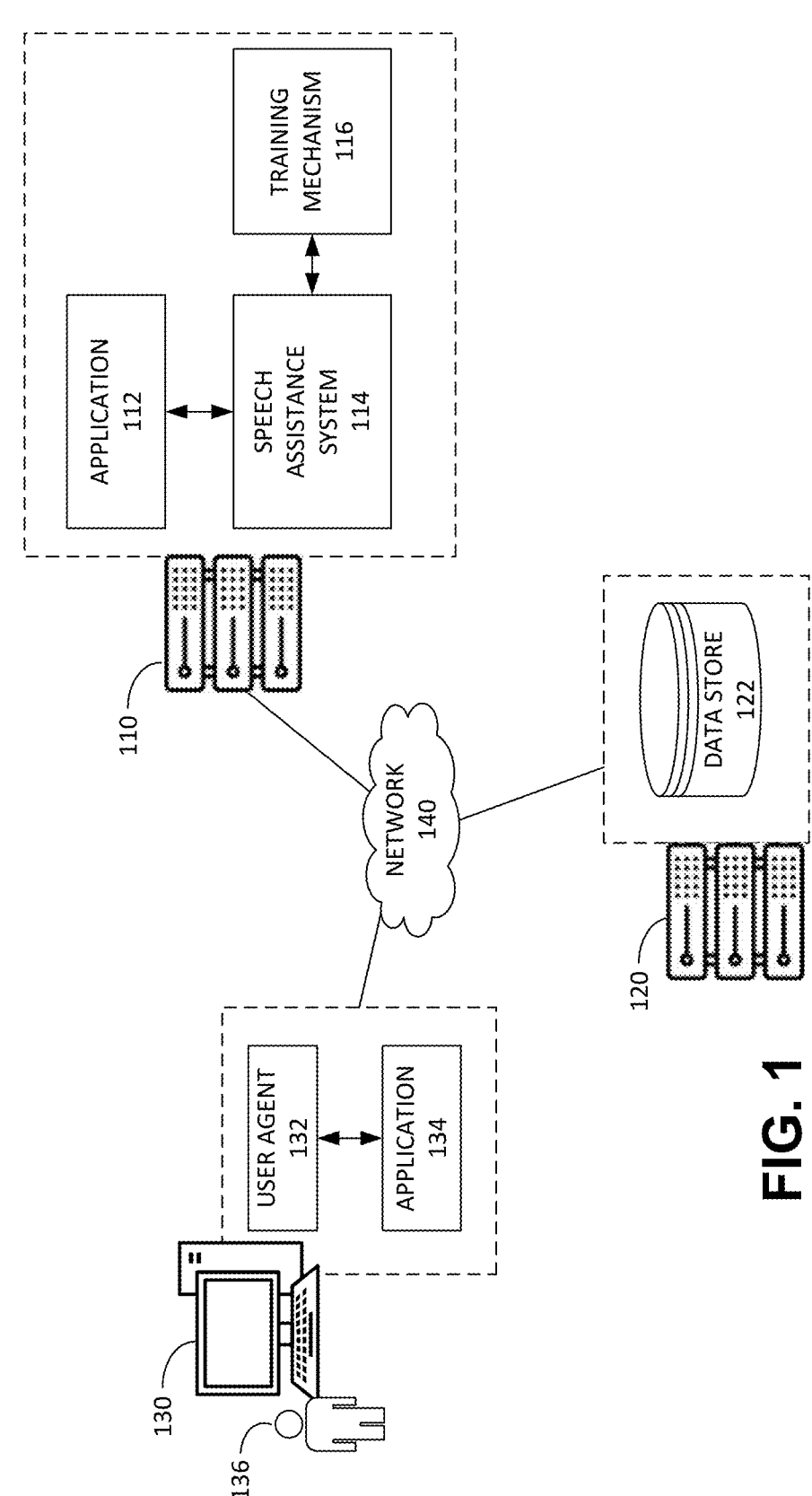
FIG. 1 depicts an example system upon which aspects of this disclosure may be implemented.

With the advancement of online communications and the shift towards remote work in recent years, more and more people use video meeting as part of their daily life. While use of video meetings can be convenient and advantageous for many users, for users with speech disorders video meetings can be very challenging. That is because the small screen, visual and/or audio aspects of video meetings make it more difficult to read body language, read lips and in general communicate effectively for users who suffer from speech disorders. This exacerbates feelings of anxiety for such users which in turn makes it even more difficult for them to communicate effectively. For example, if a person with a stammering speech disorder is participating in a team meeting where multiple participants are sharing their ideas and thoughts on a project, the person may experience difficulties in keeping up with the flow of conversation, or in expressing their own ideas effectively. The visual and auditory cues of the video meeting may exacerbate their anxiety and self-consciousness, leading to further difficulties in communication. Furthermore, if the video conferencing platform is not designed to accommodate the needs of people with speech disorders, the person may struggle to find ways to participate effectively. For example, the person may feel uncomfortable or self-conscious about their speech patterns being on display.

While some current applications provide some features to help users improve speech, these features relate to improving speech in general (e.g., improving rate of speech if a user speaks too fast). This does not help users with speech disorders during live video meetings. Thus, there exist a technical problem in current virtual meeting platforms of being inaccessible or difficult to use for users with speech disorders. This technical problem not only makes virtual meetings inaccessible to users with speech disorders but can also affect the overall quality of a virtual meeting, as users who suffers from a speech disorders are not able to participate and contribute to the meeting effectively. Furthermore, when a user with a speech disorder is unable to communicate effectively during a virtual meeting, this could lead to multiple back and forth communications between the participants, which may increase the computing bandwidth and other computing resources required for conducting the virtual meeting.

To address these technical problems and more, in an example, this description provides technical solutions for detecting certain characteristics of speech in real-time when a user is speaking that indicate a speech disorder, automatically invoking an avatar that reflects the user's speech and providing a notification to the user when a speech impediment occurs. This is achieved by utilizing a mechanism that analyzes speech in real-time to detect speech impediments that reflect a speech disorder and utilizing lip synching and/or computer vision techniques to generate an avatar that represents the user's speech in real-time. The avatar and/or other notification mechanisms is then used to notify the user when a speech impediment is detected in their speech. In some implementations, a visual cue such as a change in color of the avatar's lips is used to notify the user of the speech impediment and/or the severity of the speech impediment. Some of the mechanisms used in detecting speech impediments, identifying the severity of the speech impediment, and generating an avatar that provides a visual representation of the user's speech involve the user of artificial intelligence and/or trained machine learning models.

The technical solution described herein addresses the technical problem of the inability of current mechanisms to provide real-time speech assistance to users who suffer from speech disorders. The technical solution provides a mechanism for automatically detecting when a user suffers from speech disorder during a communication session and for generating and displaying an avatar that provides a visual representation of the user's speech. The avatar can be used to provide feedback to the user when a speech impediment is detected such that the user becomes aware of the issue. The avatar can also be used to provide a fluid representation of the user's speech to help the user feel more comfortable and confident in communicating. The technical effects include at least (1) automatically detecting in real-time when a speaker shows signs of a speech disorder; (2) automatically triggering an avatar that provides a visual representation of the person's speech during a communication session; and (3) detecting a severity of a speech impediment and notifying the user in real-time.

As will be understood by persons of skill in the art upon reading this disclosure, benefits and advantages provided by such implementations can include, but are not limited to, a technical solution to the technical problems of lack of mechanisms for offering real-time speech assistance to users who suffer from speech disorders. Technical solutions and implementations provided herein offer a mechanism for detecting speech impediments in real-time when a person is speaking, generating an avatar that uses lip synching technology to represent the person's speech in a more natural and fluid visual representation and providing a notification to the user when a speech impediment occurs during their speech. The benefits made available by these technology-based solutions provide a user-friendly mechanism for allowing the user to view a fluid representation of their speech and to learn when a speech impediment occurs such that they feel more comfortable and confident in communicating with others.

As used herein, the term "virtual meeting," "online meeting" or "video meeting" refers to a communication session between two or more individuals that is conducted via a computing device and during which the individuals are not in the same physical location, but can see each other via their computing device, if desired. The term "speech disorder" as used herein refers to a condition in which a person has problems creating or forming the speech sounds needed to communicate with others. Examples of speech disorders include but are not limited to speech sound disorders and stuttering. The term "speech impediment" as used herein refers to an instance of speech during which the person has difficulty creating or forming the speech sounds needed to communicate.

FIG. 1 illustrates an example system 100, upon which aspects of this disclosure may be implemented. The system 100 includes a server 110, which itself includes an application 112, a speech assistance system 114, and a training mechanism 116. While shown as one server, the server 110 may represent a plurality of servers that work together to deliver the functions and services provided by each service or application included in the server 110. The server 110 may also operate as a cloud-based server for speech assistance services in one or more applications such as application 112 and/or application 134. The server 110 may also operate as a shared resource server located at an enterprise accessible by various computer client devices such as a client device 130.

The server 110 includes and/or executes a speech assistance system 114, which receives and processes a request for providing speech assistance to users who suffer from a speech disorder. The request is received from an application such as the application 112 or 134. In some implementations, the request is transmitted automatically via the application 112 or 134 when a communication session such as a virtual meeting begins. For example, the application managing the virtual meeting may detect that a new meeting has begun and may automatically transmit a request for providing speech assistance services for the meeting. In other implementations, the request is transmitted once one or more users transmit a request for speech assistance (e.g., a user selects a feature of the application that enables speech assistance during the meeting) or when a selection for speech assistance has been previously made. The selection for speech assistance may be user-specific or it may be meeting specific. For example, the person scheduling the meeting may have an option for selecting live speech assistance for speech disorders during the meeting. In another example, a user may select a setting in their application that enables speech assistance whenever they participate in a virtual meeting via the application. In either scenario, upon receiving the request or along with the request, the speech assistance system 114 receives audio and/or video data of the virtual meeting and analyzes the audio and/or video data to detect speech impediments that indicate the presence of a speech disorder in one or more of the participants. This is achieved by utilizing one or more trained ML models that perform feature extraction, speech impediment detection and/or speech impediment evaluation. Upon detecting a speech disorder, the speech assistance system 114 may generate an avatar that provides a visual representation of the user's speech and/or provide notification to the user of the speech impediment. The internal structure of and data flow between the various elements of the speech assistance system 114 is discussed in greater detail with respect to FIG. 2.

One or more ML models implemented by the speech assistance system 114 are trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of artificial intelligence in the form of one or more ML models to detect speech impediments, generate an avatar that provides a visual representation of the user's speech or evaluate the speech impediment. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in speech to identify speech impediments that indicate the presence of a speech disorder. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models is selected based on factors such as, but not limited to, accuracy, computational efficiency, and/or power efficiency. In some implementations, a single trained ML model is produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes a server 120 which may be connected to or include the data store 122 which functions as a repository in which databases relating to training models and libraries of speech data are stored. Although shown as a single data store, the data store 122 is representative of multiple storage devices and data stores which may be accessible by one or more of the speech assistance system 114, training mechanism 116, and application 112.

The client device 130 is connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user 136 to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7.

The client device 130 includes a local application 134. The application 134 is a computer program executed on the client device that configures the device to be responsive to user input to allow a user to participate in a communication session such as virtual meeting. The application 134 may also enable the user to provide audio and/or video data. Examples of suitable applications include, but are not limited to, a video conferencing application such as Microsoft Teams®.

In some examples, the application used to participate in a communication session is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. Audio/video data from the application 134 or application 112 is provided via the network 140 to the speech assistance system 114 for use in providing speech assistance for speech disorders.

In some implementations, the client device 130 includes a local speech assistance system for providing speech assistance services. The local speech assistance system may be a light (e.g., simplified) version of the speech assistance system 114 that enables providing speech assistance locally. In an example, the local speech assistance system 114 receives audio/video data during a virtual meeting, utilizes a light version of the genre and speech impediment detection ML models, and utilizes a locally stored avatar generating engine or accesses a remotely located avatar generating engine to generate an avatar that provides a visual representation of the user's speech. The avatar is displayed on a display screen of the client device 130 (e.g., a user interface screen of the application 112/134 displayed on a display screen of the client device) to assist with the user's speech. While only one client device 130 is shown, it should be noted that to conduct a communication session two more client devices are used and audio/video data from the plurality of client devices used during the communication session may be submitted to the speech assistance system 114.

Figure 2:
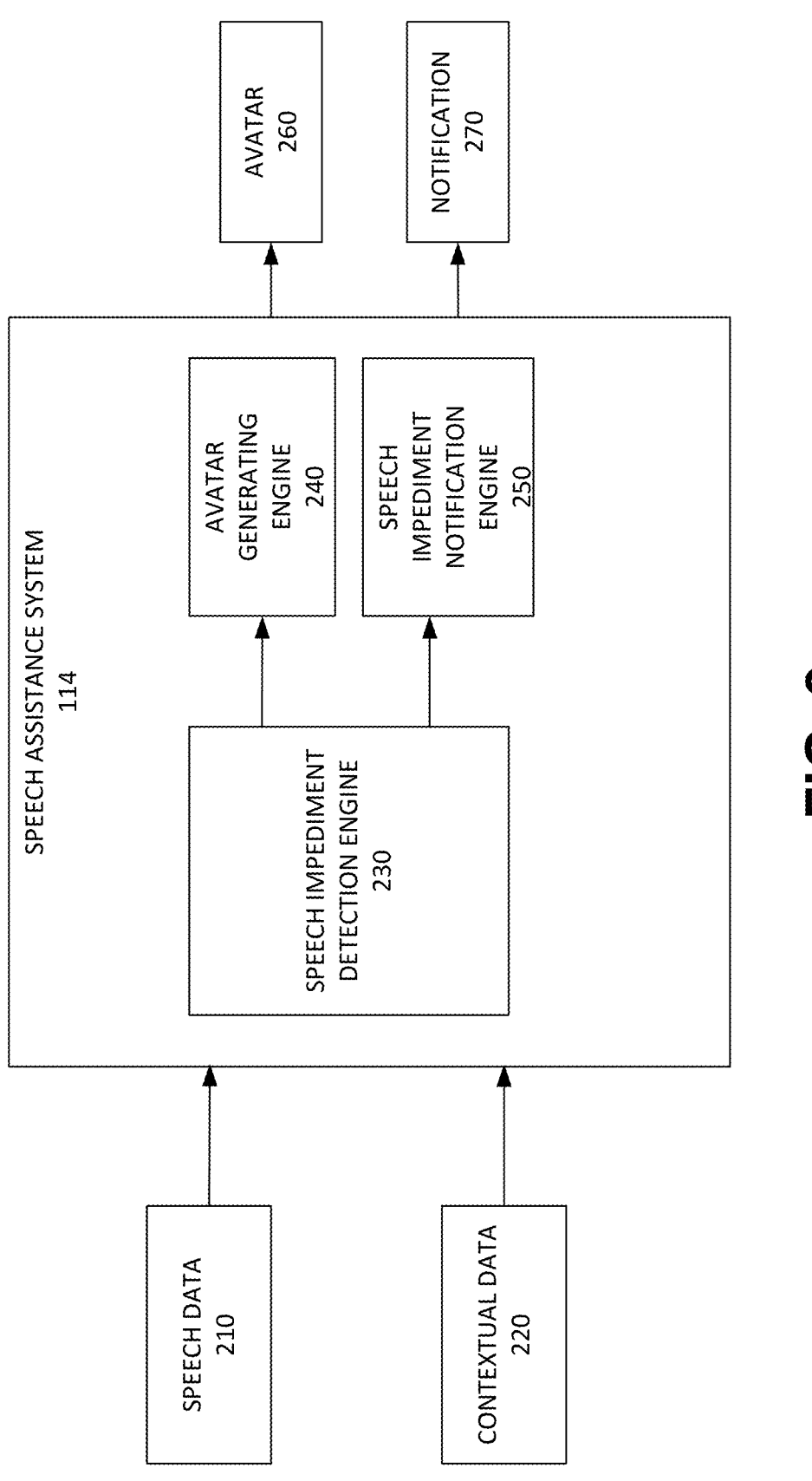
FIG. 2 depicts an example of some elements involved in providing speech assistance for improving speech impediments.

FIG. 2 depicts an example of some elements involved in providing real-time speech assistance during a communication session. Once a communication session such as a virtual meeting begins, speech data 210 from the meeting may be transmitted to the speech assistance system 114 for processing. In some implementations, speech data 210 is transmitted automatically once a virtual meeting begins. In other implementations, a determination is first made as to whether speech assistance is needed for the communication session. As discussed, the determination may be made based on a user request or a setting of the application or the meeting. In implementations where the speech data 210 is automatically transmitted when a communication session begins, the speech assistance system 114 may first determine whether speech assistance is needed for the communication session. This is achieved by analyzing the contextual data 220.

The contextual data may include information about the meeting such as the meeting title, the list of meeting participants (e.g., user IDs of participants), date and time of the meeting, length of the meeting and the like. The contextual data may also include information about the meeting participants, such as whether any of the participants had needed speech assistance in the past while using the application or whether one or more of the participants had made requests for speech assistance. The contextual data can be used to determine if the speech data should be analyzed for speech assistance. For example, the title of the meeting title may indicate the importance of a meeting. As such when the meeting title includes keywords such as "interview," "executive," "strategy," or other keywords that indicate the meeting is of importance, this information may be used to determine that speech assistance should be offered for this meeting. The speech assistance system 114 makes this determination by using ML models and/or classifiers.

The speech data 210 may include audio and/or video data captured during the virtual meeting. In some implementations, speech data 210 only includes audio data. In other implementations, both audio and video data are provided and used in detecting speech disorders. The audio and/or video data is captured and transmitted from the client device of the meeting participants. In some implementations, the audio and/or video data is captured via a camera of the client device of a participant and sent to the virtual meeting platform (e.g., communications application) used to conduct the meeting. The virtual meeting platform then transmitted the recorded audio/video data to the speech assistance system 114.

In some implementations, only speech data of participants for which speech assistance is determined to be needed is transmitted to the speech assistance system 114. In other implementations, the speech data 210 includes the aggregated speech data of the multiple participants who are participating in the meeting. For example, the audio/video of the multiple participants is aggregated by the virtual meeting platform to create the combined video feed of the meeting which is then transmitted in real-time to the speech assistance system 114. When the speech data 210 is aggregated speech data that includes audio and/or video data from multiple participants, the speech assistance system 114 may need to detect which of the participants a speech impediment relates to.

Figure 3A:
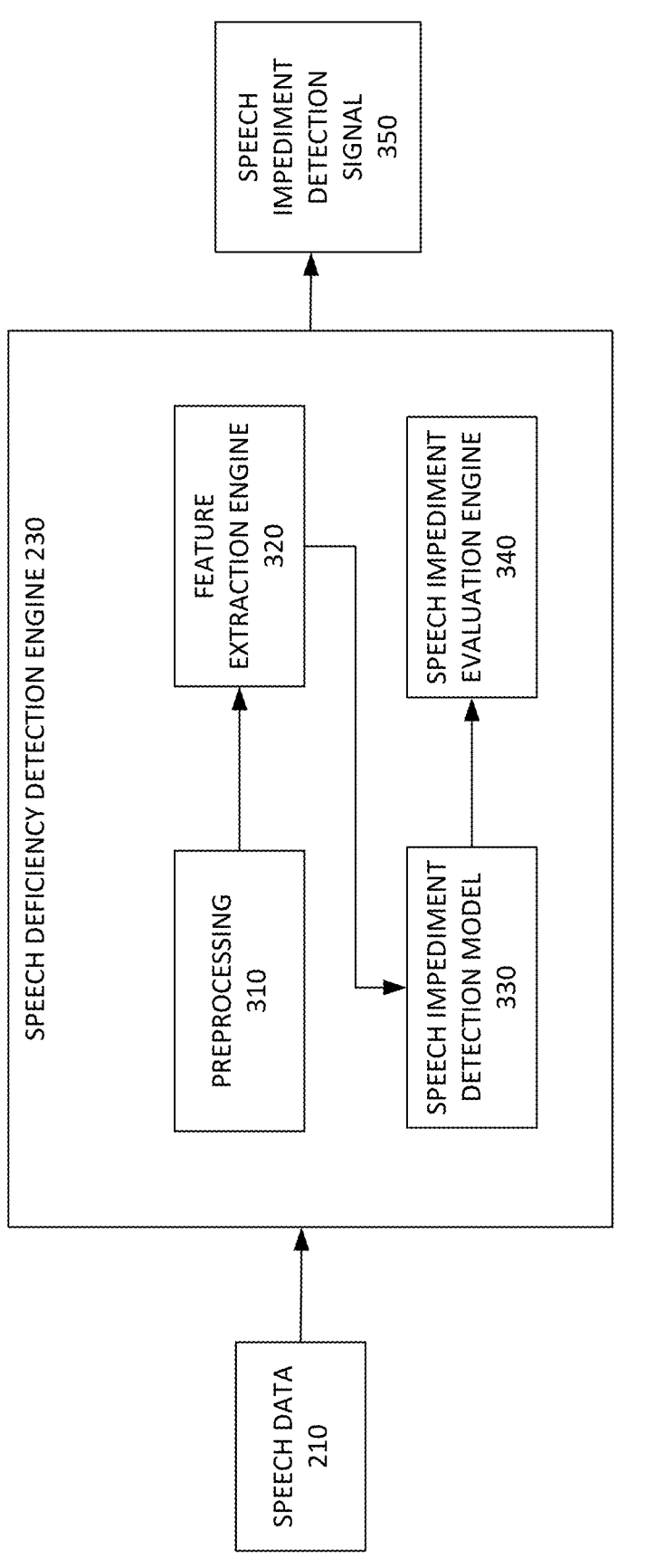
FIG. 3A depicts an example of some elements involved in detecting speech impediments.

Once the speech data 210 is received by the speech assistance system 114 and a determination is made that speech assistance is needed, the speech data 210 is provided to the speech impediment detection engine 230 for processing. The speech impediment detection engine 230 analyzes the speech data via a variety of different mechanism to determine if a speech impediment is present in the speech data. FIG. 3A depicts an example of some elements involved in detecting speech impediments. To analyze and process the speech data 210, the speech impediment detection engine 230 makes of a preprocessing engine 310, feature extraction engine 320, speech impediment detection model 330 and speech impediment evaluation engine 340.

The preprocessing engine 310 receives the speech data 210 and performs preprocessing on the audio and/or video portion of the speech data 210, as needed. Preprocessing may include segmentation, noise reduction, filtering and/or normalization to ensure the audio and/or video data is suitable for analysis. To perform the required preprocessing steps, the preprocessing engine 310 makes use of segmentation mechanisms, noise reduction mechanisms, utilizes filters and/or uses normalizers, as is known in the art. In an example, the speech impediment detection engine 230 examines the speech data 210 to determine if the audio and/or video quality meets specific quality metrics and if not, transmits the speech data 210 to the preprocessing engine 310 for processing. In another example, the speech impediment detection engine 230 divides the speech data into segments having specific sizes (e.g., time windows) for analysis. It should be noted that while both audio and video signals are discussed in this disclosure, in some implementations, only the audio data is for speech assistance.

Once preprocessing is done on the speech data to ensure the data is suitable for further analysis, or when it is determined that preprocessing is not needed, the data is transmitted to the feature extraction engine 320, which extracts relevant one or more features from the audio and/or video data to capture patterns that indicate a speech disorder. In an example, common features that are extracted from audio data include pitch, duration, energy, and pauses between words. Features that may be extracted from video data include movement of lips and/or head. These features help represent the unique speech characteristics associated with specific speech disorders. The audio or video features are extracted by the feature extraction engine 320 using known mechanisms for extracting audio or video features from data.

After the features are extracted, the extracted features are transmitted to the speech impediment detection model 330, which is an ML model or classifier that analyzes the extracted features to detect patterns that correspond with known speech impediments or speech disorders. The speech impediment detection model 330 may be an ML model that is trained on a dataset of labeled speech samples that include normal speech as well as speech that includes speech impediments. The model learns to distinguish between normal speech and speech with signs of speech impediments based on the features of the speech. As a result, when extracted speech features are provided as an input to the speech impediment detection model 330, the model can analyze the features to predict whether the segment of the speech for which the features were extracted shows signs of a speech impediments. In an example, this is done by comparing the extracted features to the learned patterns of the training data to determine if a pattern indicating a speech impediment is present. The patterns could include instances of word repetitions, prolongations, or pauses before a word when a pause is not normally present. Such patterns often indicate stuttering or difficulty formulating words, which can be a sign of a speech disorder. In some implementations, in addition to examining each segment individually, the speech impediment detection model 330 examines one or more segments before and/or after a current segment to ensure that the identified speech impediment is not an isolated event. For example, sometimes issues with the virtual meeting application cause the audio to prolongate or cause other issues that may appear like speech impediment. Examining longer segments of the speech data 210 can help the model ensure that the speech impediment is in fact a sign of a speech disorder.

In some implementations, when the speech impediment detection model 330, detects a speech impediment (e.g., word repetition) in a segment of the speech data 210, the speech impediment detection model 330, transmits the identified segment and/or a signal that indicates existence of speech impediment to the speech impediment evaluation engine 340 to evaluate the severity of the speech impediment. In an example, the speech impediment evaluation engine 340 determines the severity of the speech impediment by examining the number or percentage of speech impediment occurrences such as the number or percentage of stuttered words, the frequency of stuttered words and/or the duration of a speech impediment occurrence (e.g., the length of word prolongation or the length of time a word is repeated). This may involve examining one or more segments before and/or after an identified segment to evaluate the severity over a longer time period. In some implementations, evaluating the severity of the speech impediment is done by the speech impediment detection model 330. The severity may be measured using a speech impediment severity parameter having a known range (e.g., from 1 to 5). In an example, one or more parameters of the speech impediment such as number, frequency and length of a speech impediment event are each measured and a weight is applied to one or more of the measured parameters to generate a weighted average, which is then used as the severity measurement parameter. The measured severity measurement parameter can be normalized to generate a severity parameter than can easily be used for evaluating the severity of the speech impediment.

The resulting severity parameter is then transmitted as a speech impediment detection signal 350 to other elements of the speech assistance system 114. The speech impediment detection signal 350 may include an indication of whether a speech segment includes a speech impediment and may also include the severity parameter related to the severity of the speech impediment. In some implementations, once a speech impediment is detected, a signal is transmitted to the avatar generating engine 240 that notifies the avatar generating engine 240 of the need for an avatar. In an example, the signal includes a user identifier for the user for which speech impediment was detected. Identifying the meeting participant, a detected speech impediment is associated with may be performed by one or more elements (not shown) of the speech assistance system 114. In some implementations, the speech impediment detection engine 230 itself identifies the participant that exhibited speech impediment. For example, the speech impediment detection model 330 may include a model trained to examine speech features and compare those speech features with known speech features of the meeting participants to identify the user. In other implementations, the user is simply identified by examining the speech data 210, which itself may include identifiers for the user from which the data originated. In some implementations, identifying the meeting participant is achieved by the avatar generating engine 240.

Figure 3B:
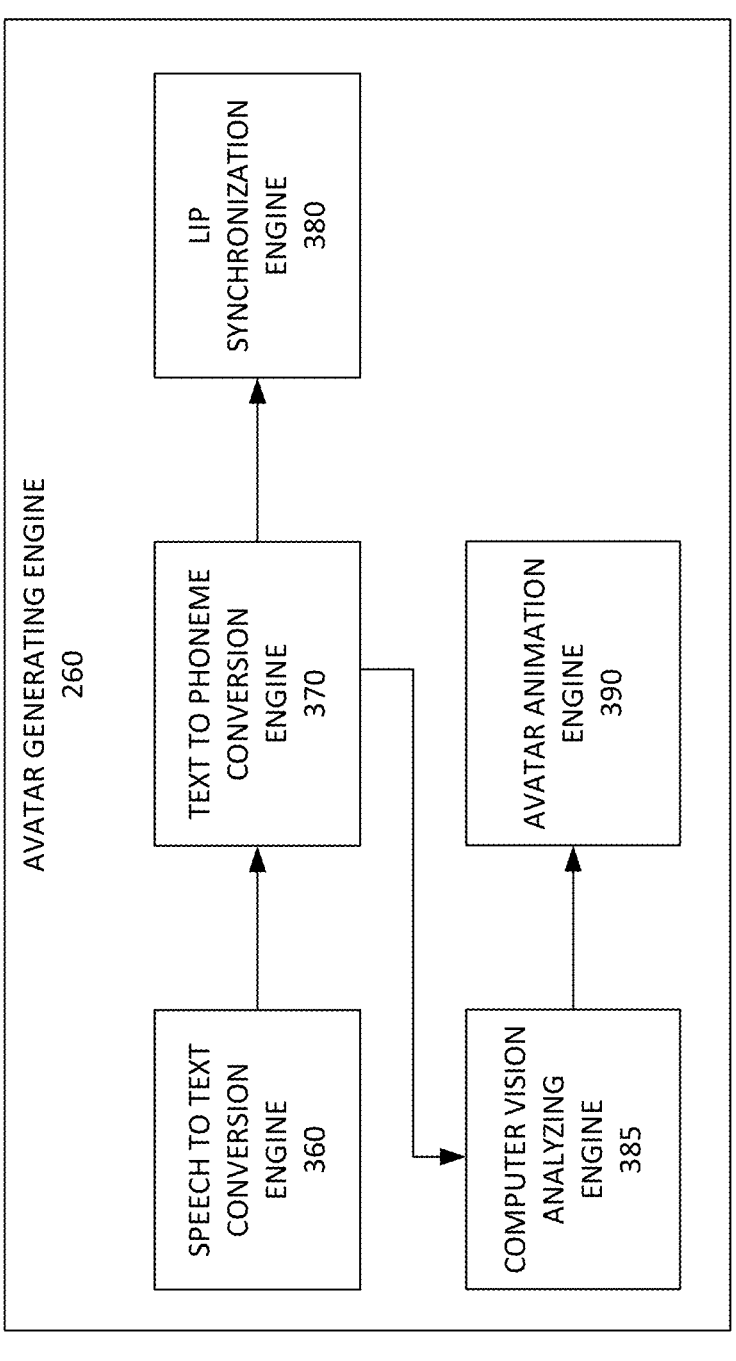
FIG. 3B depicts an example of some elements involved in generating an avatar to provide speech assistance.

FIG. 3B depicts an example of some elements used by the avatar generating engine 240 in generating an avatar to provide speech assistance. In an example, the avatar generating engine 240 includes a speech to text conversion engine 360, text to phoneme conversion engine 370, lip synchronization engine 380, computer vision analyzing engine 385 and avatar animation engine 390. To ensure that the user's speech is accurately synchronized with the avatar, the avatar generating engine 240 first utilizes the speech to text conversion engine 360 to convert the audio into text. To achieve the text conversion engine 360 utilizes one or more automatic speech recognition (ASR) algorithms that are trained models for converting audio data to text. It should be noted that while the speech to text conversion engine 360 is displayed as being part of the avatar generating engine 240, in some implementations, the audio data is transmitted by the avatar generating engine or the speech assistance system 114 to an external ASR engine to covert the audio data to a textual representation.

After the speech is transcribed into text, the text is transmitted to the text to phoneme conversion engine 370 which converts the words of the text into phonemes. Phonemes are the perceptually distinct units of sound in a specified language that distinguish one word from another. In an example, phonemes are the smallest units of sound in a language. The conversion of the text to phonemes helps in accurately generating the lip movements that correspond to each sound in the user's speech. The conversion is achieved by utilizing known mechanism for converting words to phonemes, as is known in the art.

The generated phonemes are then transmitted in an ordered sequence to the lip synchronization engine 380 which utilizes the phoneme sequence to match the sequence with pre-recorded or animated lip movement data for each phoneme. This data may be retrieved from a library of pre-recorded mouth shapes corresponding to different phonemes, or it could be generated using computer-generated animation techniques. The library of pre-recorded lip movements and mouth shapes may be stored in the avatar generating engine, elsewhere in the speech assistance system 114 or in a different storage medium such as the data store 122 of FIG. 1. The library of pre-recorded lip movements stores a predetermined lip shape and/or movement for each phoneme. When a sequence of phoneme is received for a speech segment, the lip synchronization engine 380 utilizes the library to match each phoneme in the sequence to a phoneme in the library and then retrieves the lip movements/shapes associated with each matching phoneme to generate a sequence of lip movements which can be used to accurately represent the user's speech via an avatar.

In some implementations, in addition to or instead of using lip synchronization techniques, computer vision techniques are utilized by the computer vision analyzing engine 385 to analyze the shape and/or movement of the user's lips while they are speaking. This may be achieved by utilizing the video data of the communication session to analyze the user's lips to extract data from the lip movements/shapes. The computer vision analyzing engine 385 then utilizes the extracted data to generate lip movements that mimic the lip movements of the user. In some implementations, the computer vision analyzing engine 385 includes, makes use of, or submits data to one or more ML models (e.g., lip synchronization model 335 of FIG. 3C) that are trained based on the relationship between the phonemes in the user's speech and the corresponding lip movements. These models can then generate the required lip movements without having the need to use a library of lip shapes/movements. In some implementations, the process of speech impediment detection, generating the avatar and synchronizing the avatar with the user's lips is performed by one or more ML models. In an example, some or all of the steps are performed the lip synchronization model 335.

The lip shapes and/or lip movements generated by the lip synchronization engine 380 and/or the models trained using data obtained from the computer vision analyzing engine 385 are then transmitted to the avatar animation engine 390. Using the information obtained from the lip synchronization engine 380 and/or the ML models, the avatar animation engine 390 makes use of known animation techniques to generate an animated avatar and to animate the avatar's lips to synchronize with the user's speech. The avatar's lip movements are adjusted in real-time to match the detected phonemes, creating the realistic lip-syncing representation. The avatar may be an animated image of a person or any other image that represents a person speaking. In some implementations, the avatar is generated automatically once speech impediment is detected in a user's speech. In some implementations, the severity parameter is transmitted to and used by the avatar generating engine 240 to change the appearance of the generated avatar based on the severity of the speech impediment. For example, the color of the avatar's lips may be changed based on the degree of severity of the speech impediment.

The generated avatar is transmitted as an output of the avatar generating engine 240 and the speech assistance system 114 provides the avatar 260 for display to the user experiencing speech impediment. This may be achieved by transmitting a notification and/or the avatar to the client device of the user and/or the application used by the user to participate in the communication session. In this manner, the avatar can be presented only to the user who is experiencing the speech impediment. If two or more participants experience speech impediment during the same communication session, an avatar is generated for each user who experiences the speech impediment and sent to their respective client devices and/or applications.

In some implementations, in addition to or instead of providing the avatar 260 for display, the speech assistance system 114 also provides a notification of the speech impediment via the speech impediment notification engine 250. In an example, the speech impediment notification engine 250 receives a signal indicating the presence of a speech impediment in a speech segment from the speech impediment detection engine 230. The signal may include data identifying the segment in which speech impediment was detected, the severity parameter associated with the severity, identification information for the user who is experiencing speech impediment and/or the type of speech impediment experienced. The speech impediment notification engine 250 examines the data and determines whether or not a notification other than the avatar should be provided to the user and/or the type of notification. For example, for specific types of speech impediment (e.g., long pauses between words), the speech impediment notification engine 250 may determine that an avatar is not needed. In another example, if the speech impediment severity is below a given threshold, the speech impediment notification engine 250 may determine than an avatar does not need to be displayed and instead may simply display a message to the user to notify of the existence of the speech impediment. In another example, in addition to the avatar, the speech impediment notification engine 250 may display textual notifications with suggestions for the user to correct the speech impediment (e.g., slow down and take a deep breath, etc.). The speech impediment notification engine 250 may select the type of notification by using an ML model and/or classifier. The notification data is transmitted from the speech impediment notification engine 250 in the form of notification 270 to the client device and/or the application of the user experiencing speech impediment. The notification 270 can be presented to the user in a variety of different ways. For example, an audio notification (e.g., a specific tone), a haptic notification (e.g., a vibration of a mobile device), a desktop notification and the like may be provided.

Figure 3C:
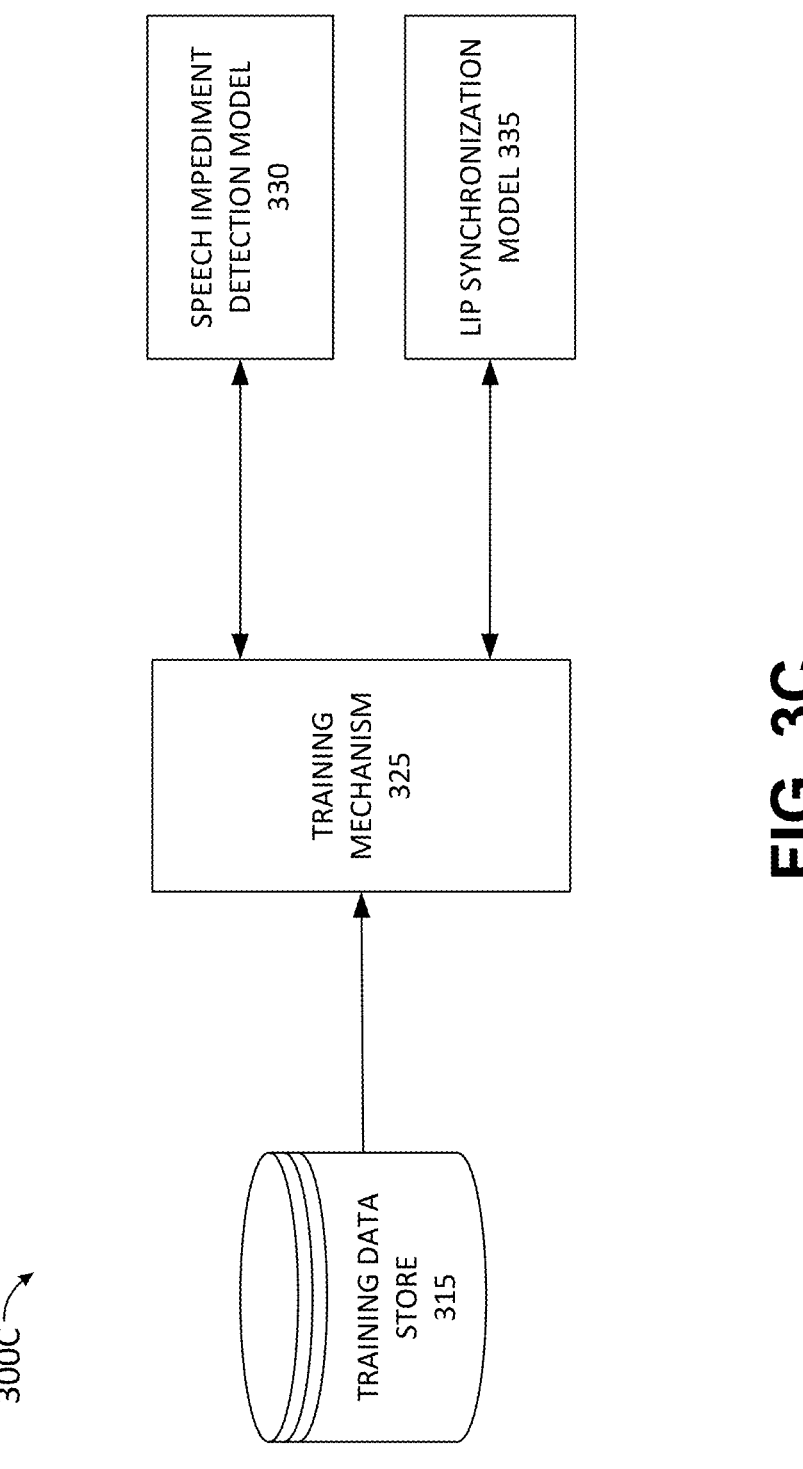
FIG. 3C depicts how one or more machine-learning (ML) models used in providing speech assistance are trained.

FIG. 3C depicts how one or more ML models used by the speech assistance system 114 are trained. In some implementations, one or more ML models implemented by the speech assistance system 114 are trained by the training mechanism 325. The training mechanism 325 uses training datasets stored in the data store 315 to provide initial and ongoing training for each of the models. Alternatively, or additionally, the training mechanism 325 may use training data sets from elsewhere. In some implementations, the training mechanism 325 uses labeled training data to train one or more of the models via deep neural network(s) or other types of ML models. The initial training may be performed in an offline stage. Additionally, and/or alternatively, the one or more ML models may be trained using batch learning. While only one training mechanism 325 is shown, in practice, a different training mechanism may be used for each different ML model.

In some implementations, a training dataset which includes labeled speech impediment data and corresponding speech features is used to train the speech impediment detection model 330. A lip synchronization model 335 may be trained using labeled data created that includes lip movements/shapes and their associated phonemes.

In some implementations, to provide ongoing training, the training mechanism 325 uses training data sets received from the ML models. Furthermore, data may be provided from the training mechanism 325 to the data store 315 to update one or more of the training datasets in order to provide updated and ongoing training. Additionally, the training mechanism 325 may receive training data such as knowledge from other pre-trained mechanisms.

Figure 3D:
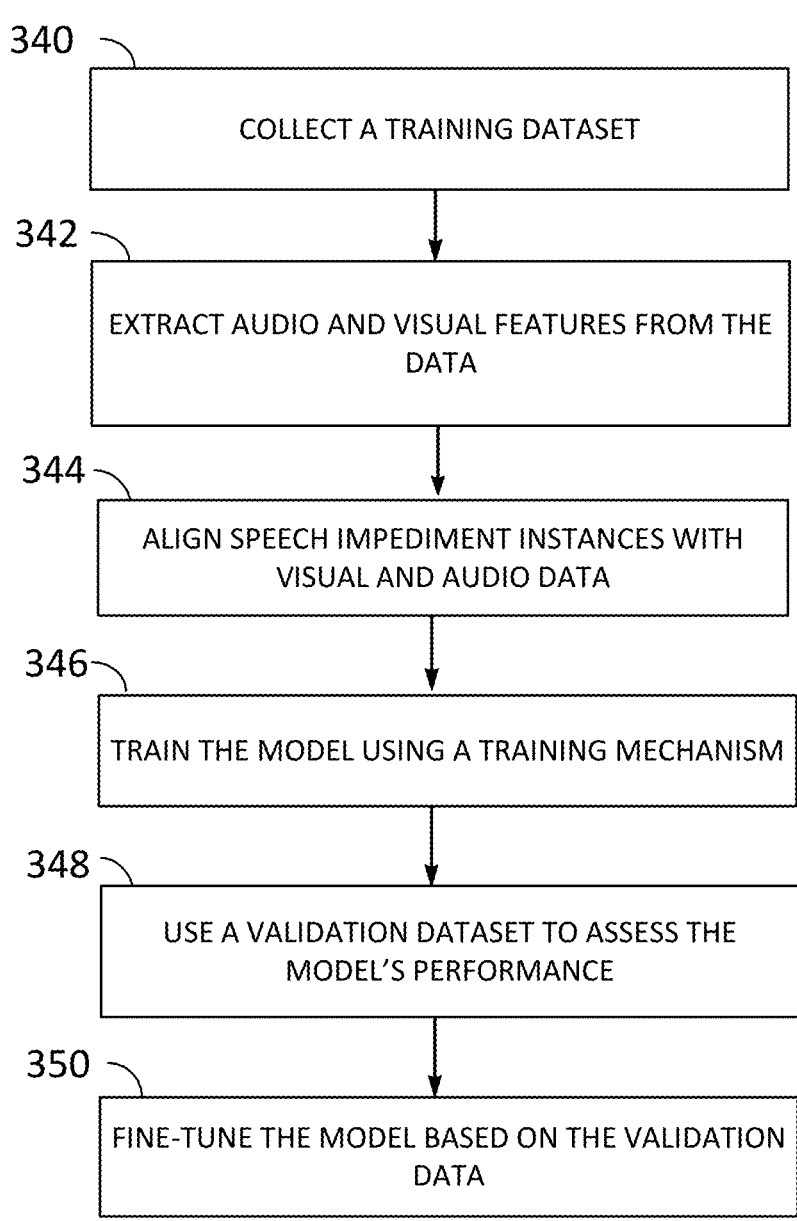
FIG. 3D is a flow diagram depicting an exemplary method for training a lip synchronization model.

FIG. 3D is a flow diagram depicting an exemplary method 300D for training a lip synchronization model such as the lip synchronization model 335. One or more steps of the method 300D may be performed by a training mechanism such as the training mechanism 325 of FIG. 3C. The method 300D may begin by collecting a training dataset, at 340. The dataset is a set of audio and/or video data of individuals with speech impediments speaking. In an example, a different dataset is collected and used for each different type of speech impediment. For example, a dataset of audio/video data of speeches from individuals who stutter may be collected. The dataset includes a variety of stuttering patterns, speech rates and/or levels of severity of stuttering. The collected data may be labeled to identify instances of stuttering. The audio and video tracks are synchronized carefully to ensure that stuttering instances are accurately aligned with corresponding lip movements of the user in the video.

After the dataset is collected, method 300D proceeds to extract audio and visual features from the data, at 342. This includes extracting features that highlight stuttering patterns, which may include the duration of stuttering blocks, the repetition of syllables and/or variations in speech rate. The speech impediment instances are then aligned with the visual and audio data and/or the extracted features, at 344. This involves accurately aligning both visual and audio data with instances of the speech impediment (e.g., stuttering) as accurate alignment is important in training the model to synchronize lip movements with speech segments that include speech impediments.

Once the data in the dataset includes extracted features and accurate alignment, method 300D proceeds to train model using a known training mechanism, at 346. The model may be a recurrent neural network (RNN) model or a transformer-based model that can capture temporal dependencies in speech. During training, the model learns to recognize and synchronize with speech patterns of a specific speech impediment. The loss function of the model may be designed to accommodate stammering irregularities. This may involve additional terms to penalize discrepancies in speech segments having speech impediments.

Once the model is trained, a validation dataset is used to assess the model's performance, at 348. The validation dataset includes speech segments that include the specific speech impediment. The output of the model from the use of the validation dataset is used, to fine-tune the model, at 350. Fine-tuning may include adjusting the hyperparameters and loss functions, as needed to improve synchronization with the speech impediment. Once the model is trained, it can be integrated into a speech assistance system for real time use. During integration, consideration may be given to the real-time detection of speech impediment instances in the speaker's speech. During use of the model, the model may be continually monitored, and feedback may be collected on how well the avatar synchronizes with speech impediments during virtual meetings. The feedback is then used to further fine-tune the model and ensure the model adapts to different speech impediment patterns and user preferences.

FIG. 3E is a flow diagram depicting an exemplary method 300E for using a lip synchronization model such as the lip synchronization model 335 to synchronize an avatar with a user's speech. The method 300E begins by receiving data from a communication session in real time, at 360. In some implementations, the model or a different part of the system analyzes the data in real time to detect instances of speech impediment, including the severity and duration of the speech impediment blocks. Based on the real time analysis of the user's speech, the lip synchronization model generates lip movements for the avatar, at 362. These lip movements are synchronized with the user's speech, including the segments having speech impediments. The model then generates an avatar for the user, at 364. The avatar can be a 2D or 3D representation and is generated on the screen or in a virtual environment. In some implementations, the avatar is generated using a different model or engine. The avatar's facial features, including the lips, are animated in real time based on the lip movements generated by the model. The lip movements of the avatar are then synchronized with the speaker's speech, at 366, before the avatar is visualized in real time, 368. The avatar's lip movements are visualized in real time during the communication session. As the person speaks, the avatar's lips move to match the speech, including the speech impediment segments, creating a visually synchronized representation. In some implementations, the model is also trained to synchronize the avatar's facial expressions with that of the user. The facial expressions include eye movements, eyebrow raises, and the like to convey the speaker's emotions and/or intent. The model synchronizes the avatar's facial expressions with the user's at 370.

In some implementations, while the model is being used, user feedback is continually collected to improve the model's performance. This can involve adjusting the lip synchronization model, enhancing visual realism, and addressing user preferences. In this manner, the model can be used to generate an avatar that provides a visually synchronized representation of a person with speech challenges, including stuttering, during communication sessions such as video meetings. This avatar enhances communication and inclusivity by ensuring that the speaker's message is effectively conveyed, irrespective of their speech challenges.

Figure 4A:
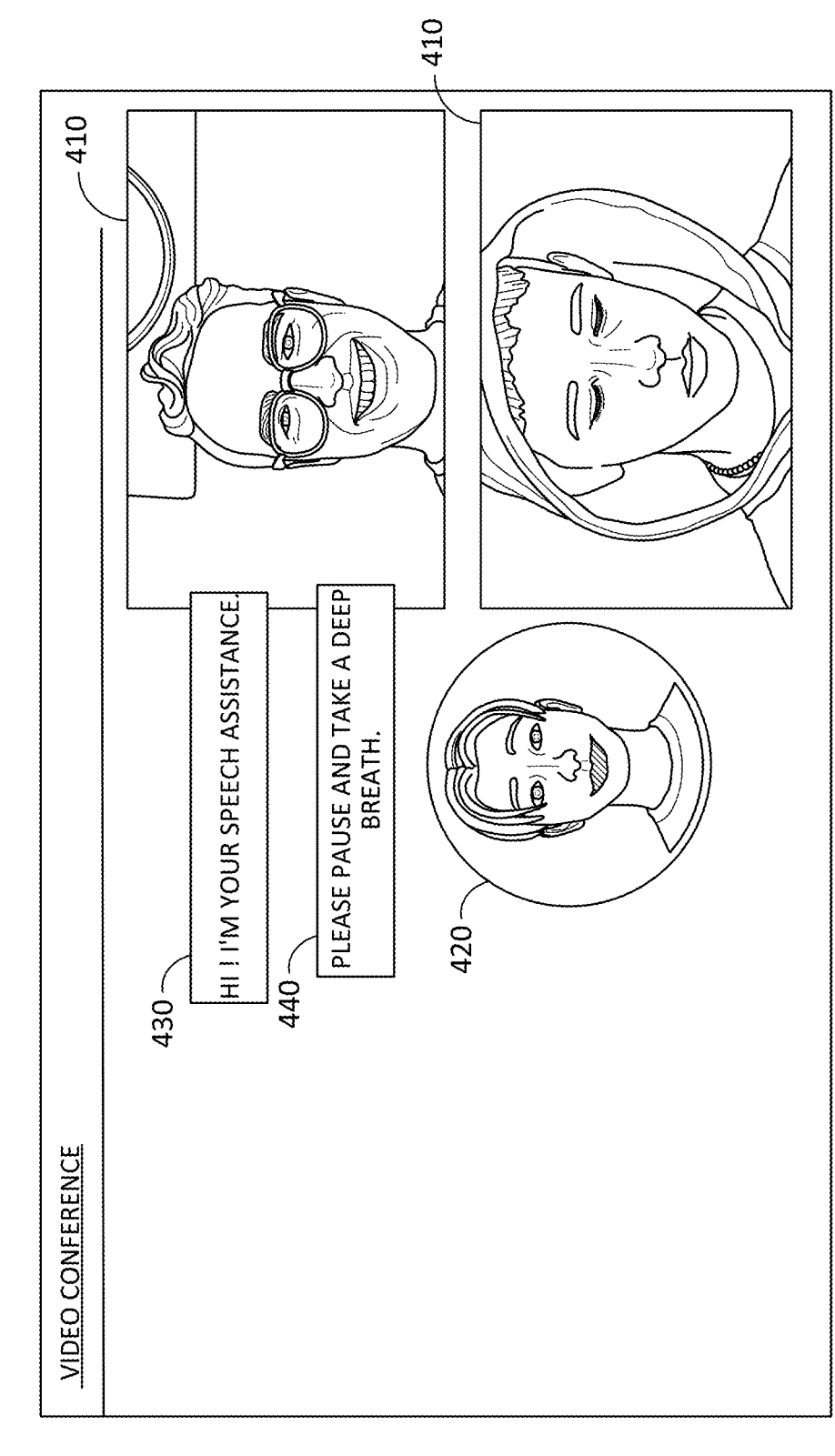
FIGS. 4A-4B depict example GUI screens of an application or service that offers speech assistance for improving speech impediments.
Figure 4B:
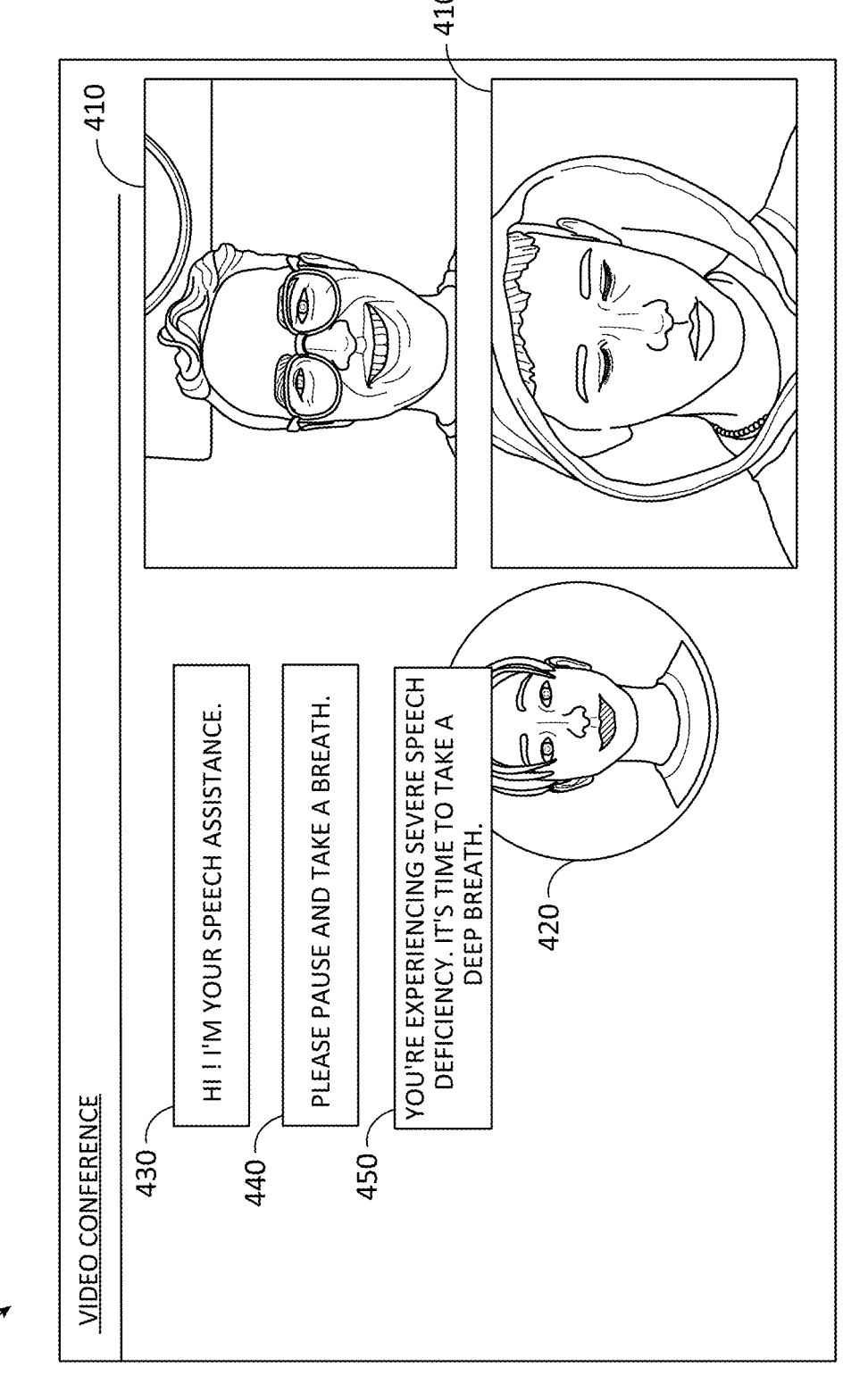

FIGS. 4A-4B depict example GUI screens of an application or service that offers speech assistance for improving speech impediments. In some implementations, the GUI screen 400A of FIG. 4A is displayed by a video conference platform, while the meeting is in progress. The GUI screen displays a video portion 410 of each of the participants which displays the video feed from the client device of each participant. While GUI screen 400A displays a separate video portion 410 for each participant, in some implementations, a video feed or even video conferencing is not required for providing the speech assistance services. When one of the participants is detected as experiencing a speech impediment, the avatar 420 may be automatically displayed to provide a visual representation of the user's speech. In an example, one or more user interface (UI) elements such as the UI elements 430 and 440 are also displayed to notify the user of that speech assistance is being provided and/or to provide notifications or suggestions that can help the user improve their speech. The assistant UI elements and the avatar are displayed concurrently along with the video feed of the video conferencing session to assist the user in real time during the meeting. Additionally, the avatar 420 provides visual feedback to the user in real-time about how the user is speaking which can help the user regulate their speech. Moreover, the avatar may provide feedback regarding the severity of the speech impediment by, for example, changing the color of the avatar's lips. For example, the color yellow may be used to indicate moderate severity, while the color red is used to indicate high severity. FIG. 4B depicts an alternative GUI screen 400B which displays different color lips on the avatar 420 to indicate a change in the severity of the speech impediment. Moreover, screen 400B displays an additional message by utilizing the UI element 450 to help the user improve their speech.

FIG. 5 is a flow diagram depicting an exemplary method 500 for providing speech assistance during a communication session. One or more steps of the method 500 may be performed by a speech assistance system such as the speech assistance system 114 of FIGS. 1-2, by a local speech assistance system and/or by an application such as applications 112/134 of FIG. 1. The method 500 may begin, at 505, and proceed to receive a request to provide speech assistance during a communication session between a plurality of participants, at 510. This may occur, for example, when a user submits a request to receive speech assistance during a communication session such as virtual meeting or when a setting of the virtual meeting indicates that speech assistance should be provided for the communication session. The request may include speech data associated with the communication session or the speech data may be accessed in other ways, for example, by retrieving the speech data.

Once the speech data is received or accessed, the speech data is analyzed to detect a speech impediment for one or more of the meeting participants, at 515. This may be done by utilizing a speech impediment detection engine which may use a trained machine-learning. Once a speech impediment is detected, method 500 proceeds to automatically generate an avatar representing the user who is experiencing the speech impediment, at 520. The avatar is then synchronized with the user's speech, at 525. This may be achieved by converting audio data of the speech to text, converting the text to phonemes and then using the phonemes to synchronize the avatar's lips shape and/or lip movements with the participant's speech.

The avatar is then provided for display to the participant, at 530. This may involve transmitting the generated avatar to the client device and/or the communication application of the participant experiencing speech impediment. The avatar is then used to provide real-time visual feedback to the participant, at 535, before method 500 ends at 540.

Figure 6:
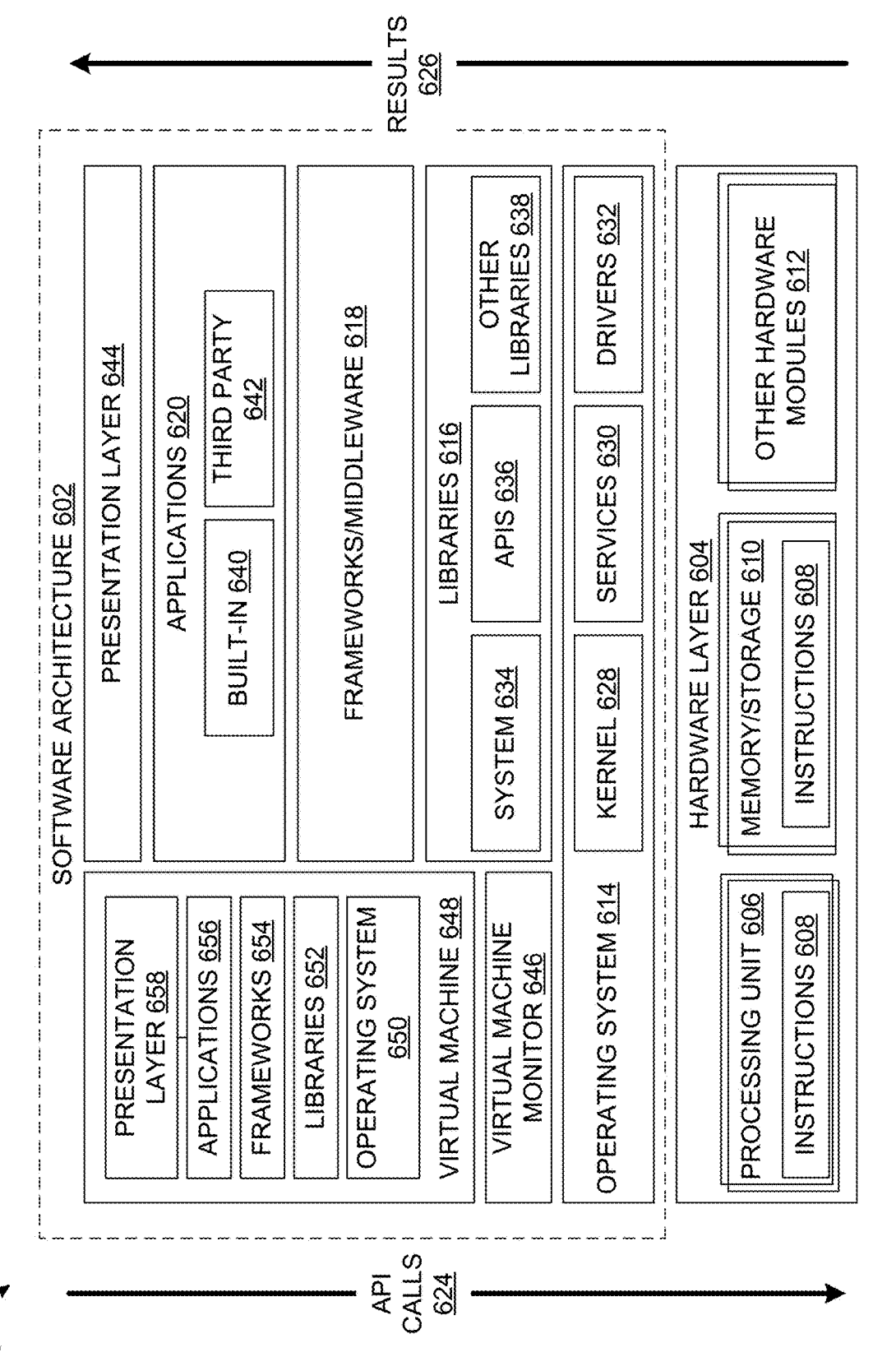
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
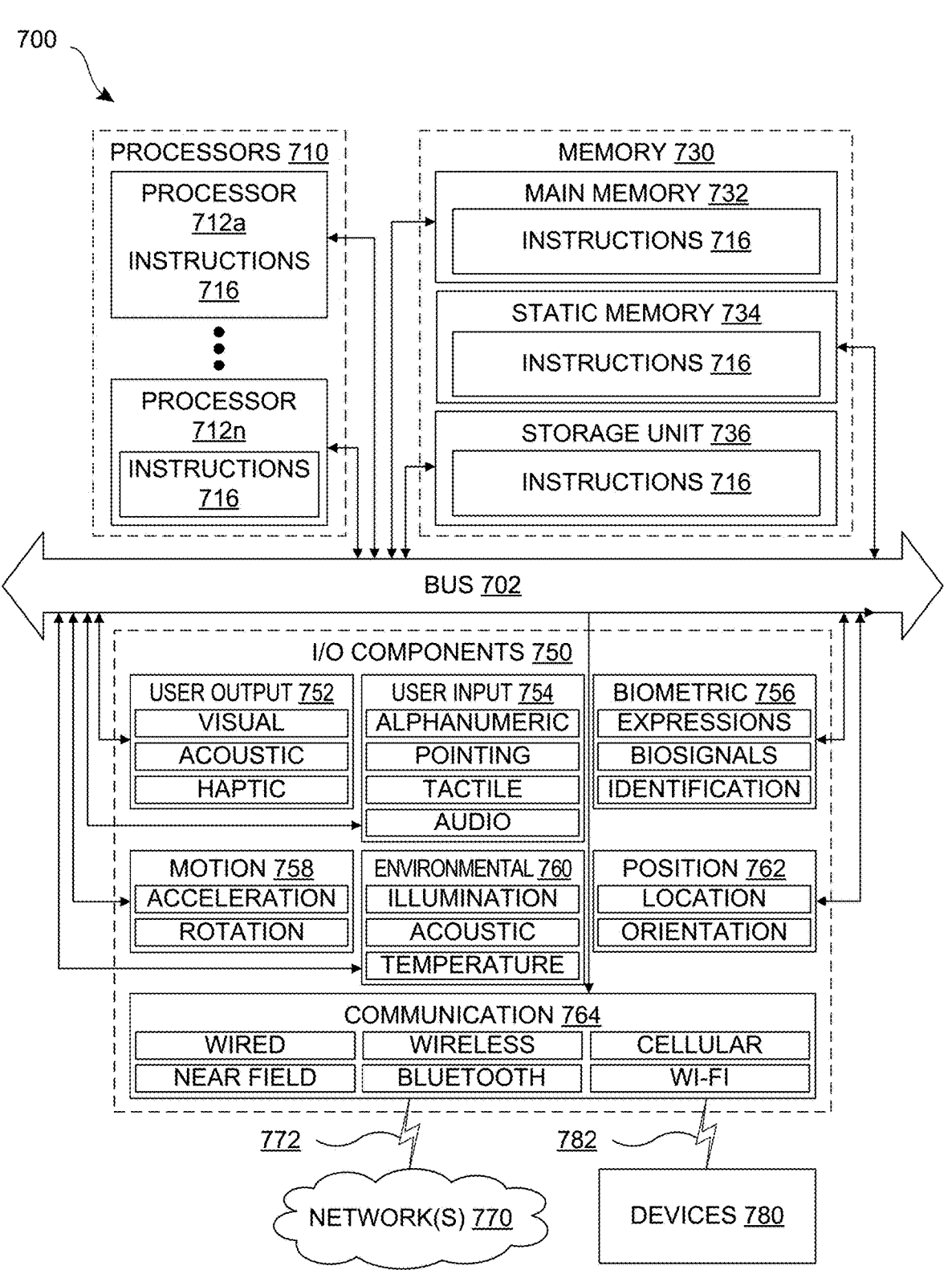
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in the form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
accessing speech data from a communication session between a plurality of participants, the communication session being conducted via a communications application over a network;
extracting a plurality of audio features from the speech data;
providing the plurality of audio features as an input to a speech impediment detection machine-learning (ML) model to detect a speech impediment and a type of the speech impediment for one of the plurality of participants;
upon detecting the speech impediment, determining from the type of the speech impediment whether an avatar is needed;
when the avatar is determined to be needed, utilizing a lip synchronization engine to generate the avatar that provides a visual representation of the one of the plurality of participants;
providing the avatar for display on a user interface screen of the communications application of the one of the plurality of participants, upon detecting the speech impediment; and
synchronizing the avatar with a speech of the one of the plurality of participants in real-time during the communication session to provide real-time visual feedback of the speech to the one of the plurality of participants.

2. The data processing system of claim 1, wherein the memory further comprises executable instructions that, when executed by the processor, cause the data processing system to perform functions of:
using automatic speech recognition to convert the speech of the one of the plurality of participants to text; and
converting the text to phonemes and using the phonemes to synchronize a movement of lips of the avatar with the speech of the one of the plurality of participants.

3. The data processing system of claim 1, wherein the lip synchronization engine utilizes a trained lip synchronization ML model to synchronize lips of the avatar with the speech of the one of the plurality of participants.

4. The data processing system of claim 3, wherein the trained lip synchronization ML model is trained using labeled data that includes lip movements and their associated phonemes.

5. The data processing system of claim 3, wherein the trained lip synchronization ML model is trained by:
extracting audio and visual features from a training dataset of speech data;
aligning speech impediment instances with at least one of visual and audio features of the speech data for the training dataset;
training the trained lip synchronization ML model using the training dataset;
using a validation dataset to assess a performance of the trained lip synchronization ML model; and
fine-tuning the trained lip synchronization ML model based on the performance.

6. The data processing system of claim 3, the trained lip synchronization ML model synchronizes the lips of the avatar with the one of the plurality of participants speech by:
analyzing the speech data to generate lip movements for the avatar;
generating the avatar for the user; and using the lip movements to synchronize the lips of the avatar with the speech of the one of the plurality of participants.

7. The data processing system of claim 1, wherein the memory further comprises executable instructions that, when executed by the processor, cause the data processing system to evaluate a severity level of the speech impediment by measuring a severity parameter.

8. The data processing system of claim 7, wherein the memory further comprises executable instructions that, when executed by the processor, cause the data processing system to provide a notification of the severity level to the one of the plurality of participants.

9. The data processing system of claim 8, wherein providing the notification of the severity level includes using a visual cue associated with the avatar.

10. The data processing system of claim 8, wherein providing the notification of the severity level to the one of the plurality of participants includes changing a color of lips of the avatar.

11. A method for providing speech assistance during a virtual meeting comprising:
   receiving a request over a communication network to provide speech assistance during a virtual meeting between a plurality of participants;
   extracting a plurality of audio features from speech data of the virtual meeting;
   providing the plurality of audio features as an input to a speech impediment detection machine-learning (ML) model to detect a speech impediment and a type of the speech impediment for one of the plurality of participants;
   upon detecting the speech impediment, determining from the type of the speech impediment whether an avatar is needed;
   when the avatar is determined to be needed, generating the avatar for the one of the plurality of participants;
   synchronizing the avatar with a speech of the one of the plurality of participants in real-time during the virtual meeting to provide real-time visual feedback of the speech to the one of the plurality of participants; and
   providing the avatar for display on a user interface screen of a communications application to the one of the plurality of participants.

12. The method of claim 11, further comprising preprocessing the speech data to perform one or more of noise reduction, filtering, and normalization.

13. The method of claim 11, further comprising:
   converting the speech of the one of the plurality of participants to text;
   converting the text to an ordered sequence of phonemes;
   comparing each phoneme in the ordered sequence of phonemes to lip movement data to identify one or more lip movements that correspond with each phoneme in the ordered sequence of phonemes; and
   utilizing the one or more lip movements to synchronize a movement of lips of the avatar with the speech.

14. The method of claim 11, wherein the speech impediment detection ML model is trained on a dataset of labeled speech samples that associate audio features of the labeled speech samples with speech impediments.

15. The method of claim 11, wherein the type of the speech impediment is stuttering.

16. The method of claim 11, further comprising measuring a severity of the speech impediment.

17. The method of claim 11, wherein the avatar is displayed on the user interface screen concurrently along with a video feed of the virtual meeting.

18. A non-transitory computer readable medium on which are stored instructions that, when executed, cause a programmable device to perform functions of:
   accessing speech data from a communication session between a plurality of participants, the communication session being conducted via a communications application over a network;
   extracting a plurality of audio features from the speech data of a virtual meeting;
   providing the plurality of audio features as an input to a speech impediment detection machine-learning (ML) model to detect a speech impediment and a type of the speech impediment for one of the plurality of participants;
   upon detecting the speech impediment, determining from the type of the speech impediment whether an avatar is needed;
   when the avatar is determined to be needed, utilizing a lip synchronization engine to generate the avatar that provides a visual representation of the one of the participants;
   providing the avatar for display on a user interface screen of the communications application of the one of the plurality of participants, upon detecting the speech impediment; and
   synchronizing the avatar with a speech of the one of the plurality of participants in real-time during the communication session to provide real-time visual feedback of the speech to the one of the plurality of participants.

19. The non-transitory computer readable medium of claim 18, wherein the stored instructions when executed, cause the programmable device to further perform functions of evaluating a severity level of the speech impediment by measuring a severity parameter.

* * * * *